United States Patent [19]

Young et al.

[11] Patent Number: 4,993,794
[45] Date of Patent: Feb. 19, 1991

[54] INTEGRATED OPTIC WAVEGUIDE WITH BEND

[75] Inventors: Terence P. Young, Chelmsford; Stuart N. Radcliffe, Shenfield; Edwin F. W. Leach, Chelmsford, all of United Kingdom

[73] Assignee: GEC-Marconi Limited, Stanmore, United Kingdom

[21] Appl. No.: 395,456

[22] Filed: Aug. 18, 1989

[51] Int. Cl.⁵ .................................................. G02B 6/10
[52] U.S. Cl. ................................ 350/96.12; 350/96.15
[58] Field of Search .................. 350/96.11, 96.12, 96.15

[56] References Cited

U.S. PATENT DOCUMENTS

| | | | |
|---|---|---|---|
| 4,015,893 | 4/1977 | Sugano et al. | 350/96.1 |
| 4,695,121 | 9/1987 | Mahapatron et al. | 350/96.12 |
| 4,810,049 | 3/1989 | Fischer et al. | 350/96.12 |
| 4,906,062 | 3/1990 | Young | 350/96.12 |

FOREIGN PATENT DOCUMENTS 2113006  7/1983  United Kingdom .

OTHER PUBLICATIONS

Minford et al., "Low-Loss Ti:LiNbO₃ Waveguide Bends at λ=1.3 μm", *IEEE J. Quantum Electr.*, vol. QE-18, No. 10, Oct. 1982, pp. 1802–1806.

Johnson et al, "Low-Loss LiNbO₃ Waveguide Bends with Coherent Coupling", *Optics Letters*, vol. 8, No. 2, Feb. 1983, pp. 111–113.

Neumann et al., "Sharp Bends with Low Losses in Dielectric Optical Waveguides", *Appl. Optics*, vol. 22, No. 7, Apr. 1983, pp. 1016–1022.

Swanson et al., "Low-Loss Semiconductor Waveguide Bends", *Optics Letters*, vol. 13, No. 3, Mar. 1988, pp. 245–247.

*Primary Examiner*—John D. Lee
*Attorney, Agent, or Firm*—Spencer & Frank

[57] ABSTRACT

An integrated optic device includes a waveguide which is curved and includes a section at the bend which is capable of supporting more than one waveguide mode at the opearting frequency. This enables bend angles of greater than 5° be to accommodated without excessive power losses.

14 Claims, 5 Drawing Sheets

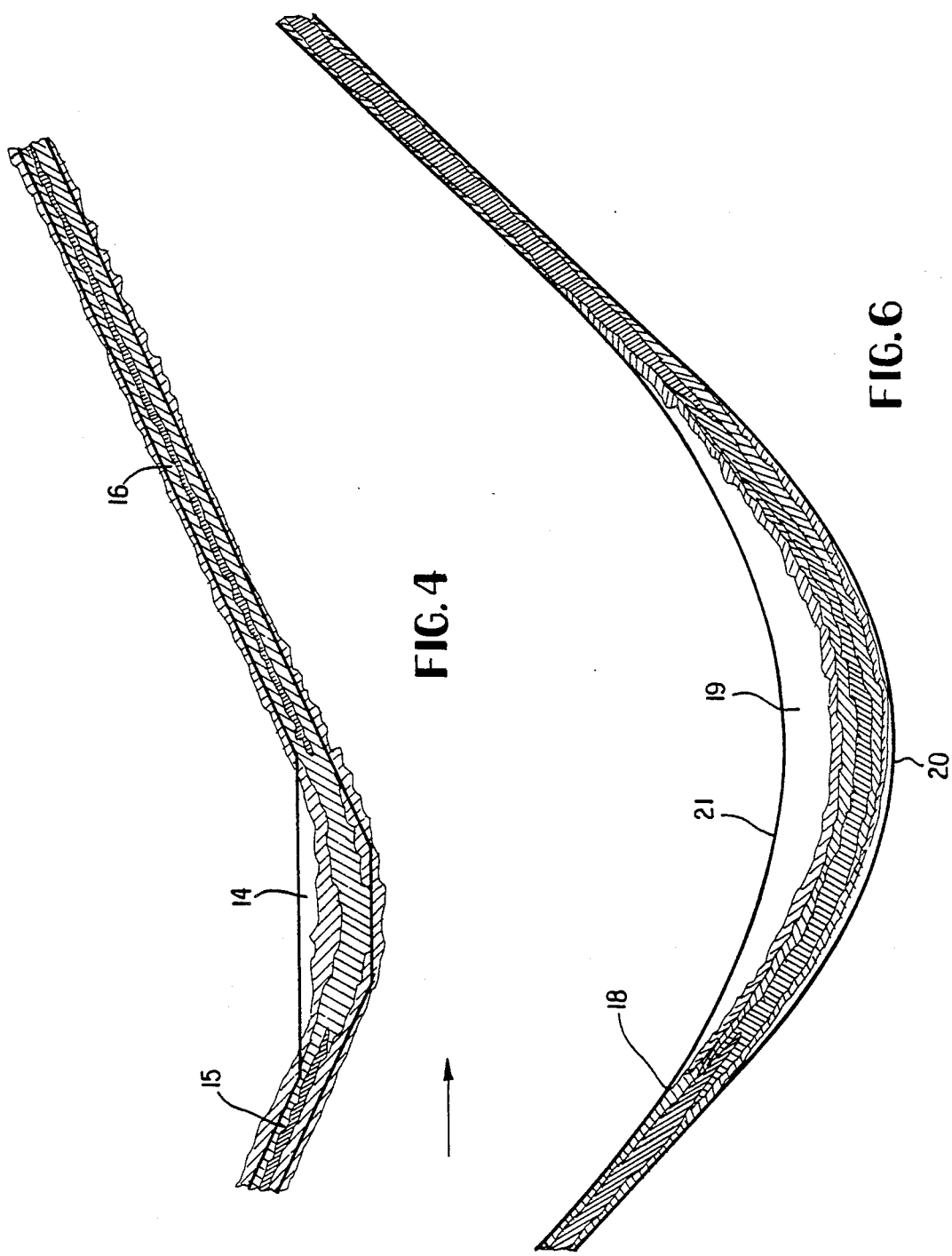

INTEGRATED OPTIC WAVEGUIDE WITH BEND

BACKGROUND OF THE INVENTION

This invention relates to integrated optic devices and more particularly to those devices which include an optical waveguide having a bend.

A fundamental consideration in the design of integrated optical circuits is the packing density of components on a substrate. This is limited principally by the angles through which waveguides may be turned in order to access each component. In presently known semiconductor optical circuits, much of the substrate area is taken up with waveguides fanning into and out of devices, or clusters of devices, at low angles, typically about one degree.

A number of techniques have been proposed to enable the bend angle of optical waveguides to be increased without unacceptable losses being sustained in bending light around corners. One proposed solution is to "chamfer" the bend so that its outer region is removed. This method is illustrated in FIG. 1 where the waveguide 1 includes a bend at 2, the outer part of which is chamfered, as shown at 3. The intensity of light entering from the left of the waveguide, in the direction shown by the arrow, is represented by the weight of shading of different regions of the waveguide 1 and the surrounding structure. Although chamfering gives satisfactory results for low angle bends of, say, less than one degree in the case of weakly guiding structures, it does not offer good enough performance to make it a viable technique for higher angle bends.

SUMMARY OF THE INVENTION

The present invention arose in an attempt to provide a waveguide structure capable of handling large angle bends without unacceptable power losses.

According to the invention, there is provided an integrated optic device comprising an optical waveguide having a bend and a waveguide section at the bend capable of supporting more than one waveguide mode at the operating frequency. By employing the invention, it has been found that high angle bends, for weakly guiding structures in the region of 5° or more, may be accommodated without large power losses being sustained. When light is transmitted in two modes along the section, the locus of maximum intensity in the waveguide oscillates from side to side so that the combined wavefront tilts to the left and then to the right. It is believed that, by including the section of more than one mode, this effect may be used to assist in bending light around corners, although other unidentified factors are also thought to be present. The section may be a bi-moded guide or a multi-moded guide in which three or more modes are present.

It is preferred that the waveguide is substantially symmetrical in configuration about the bend in the region of the bend. The parts of the waveguide adjacent to the section are then inclined with respect to that section by the same amount, such that if, for example, a total bend angle of 6° is required, there is a 3° angle between each of the adjacent parts and the section. However, there may be some applications in which it is more convenient to employ an asymmetric configuration.

In one advantageous embodiment, there is a smooth transition between the inner bound of the section and that of at least one of the adjacent parts of the waveguide, and it is further advantageous that there is a smooth transition between the outer bound of the section and that of at least one of the adjacent parts of the waveguide. It has been found that a structure which includes smooth transitions between the section and adjacent parts of the waveguide has particularly low losses. However, it is possible to employ an arrangement in which the bounds of the waveguide are stepped between the section and the adjacent parts of the waveguide and still achieve satisfactory performance.

It is preferred that the dimensions of the waveguide are arranged such that the amount of optical power transmitted in each mode of the section is substantially equal. It is believed that, when this condition is fulfilled, the cleanest interchange of energy from one side of the section to the other will occur. Both symmetric and antisymmetric modes may be present, and it is desirable that the power transmitted in each mode is substantially the same. In a preferred embodiment of the invention, at an end of the section, the centre line of a portion of the waveguide adjacent the section is offset from the centre line of the section. By suitably choosing the amount of offset, the relative power distribution between the modes of the section may be at least partially controlled. The amount of offset required to give the best results may be determined empirically for a particular structure.

In a particularly advantageous embodiment of the invention, the outer bound of the section is curved. This enables a relatively smooth transition to be obtained between the section and adjoining portions of the waveguide so that there is no discontinuity of slope on the outer bound of the waveguide at the bend. The inner bound of the section may also be curved.

In another advantageous embodiment of the invention, the refractive index within the section is greater than that of parts of the waveguide adjacent to it. By selecting appropriate values for the refractive indices of the section and the adjacent parts, the section may be made to support a plurality of modes whereas the adjacent parts are monomode. The section may have more than one index value or there could be a continuous gradient change in refractive index within the section. The waveguide may be of uniform width, this being particularly convenient where it is wished to minimize the area of a device occupied by optical waveguides.

BREIF DESCRIPTION OF THE DRAWINGS

Some ways in which the invention may be performed are now described by way of example, with reference to the accompanying drawings, in which:

FIGS. 2 to 7 illustrate various embodiments of the invention, in which, for FIGS. 2 to 4 and FIG. 6, the amount of shading is representative of the intensity of light within the device when light is transmitted from the left-hand side as shown.

DESCRIPTION OF PREFERRED EMBODIMENTS

Figure 2:
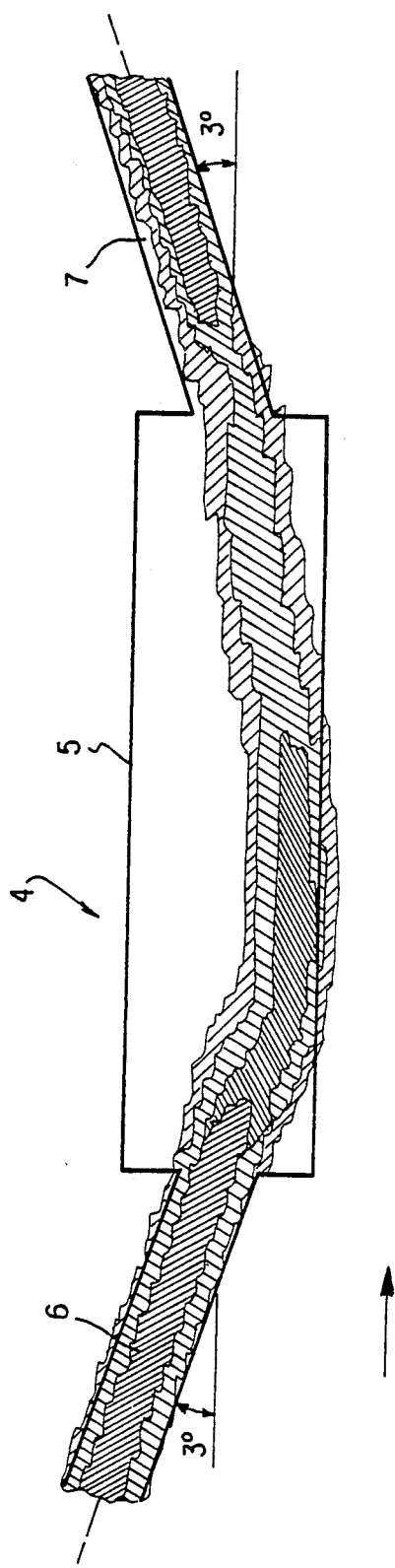

With reference to FIG. 2, an integrated optic device has a substrate of InP and includes a waveguide 4 of InGaAsP having a bi-moded section 5 and adjacent waveguide portions 6 and 7 which are inclined relative to the section 5 to give a total bend angle of 6°. The inner and outer bounds of the waveguide are stepped where the section 5 and adjacent portions 6 and 7 of the waveguide meet. The centre-lines of the section 5 and portions 6 and 7 are indicated by broken lines. It can be seen that, in this embodiment, the centre lines of portions 6 and 7 are not offset from the centre line of section 5 at the ends of that section. The wavelength of light transmitted along the waveguide is 1.55 microns and the width of the lead-in and lead-out portions 6 and 7 is of the order of 2 microns. The bi-moded section 5 is between about 150 and 200 microns long and has a width of about 4 microns. This arrangement has losses which are reduced compared to those of previously known structures.

Figure 3:
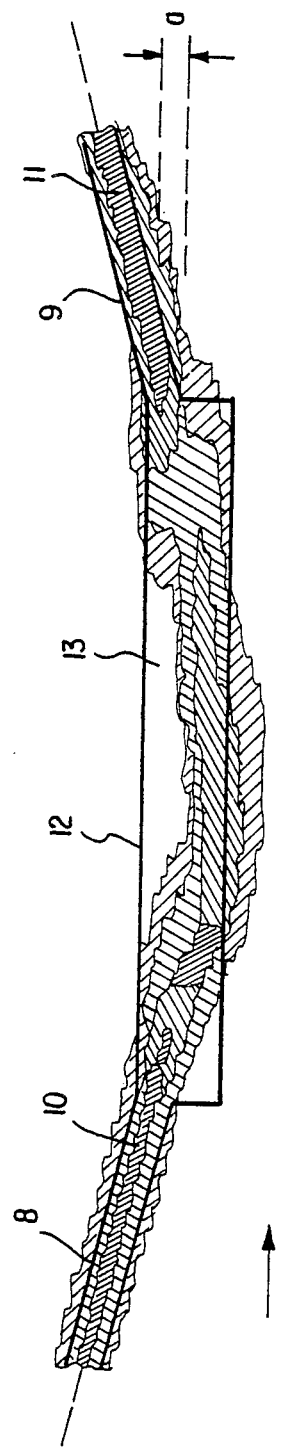

FIG. 3 illustrates another embodiment of the invention, in which there is a smooth transition between the inner bounds 8 and 9 of the lead-in and lead-out portions 10 and 11 and the inner bound 12 of adjacent bi-moded section 13, the outer bounds being stepped. Also in this embodiment, the centre lines of portions 10 and 11 are offset from the centre line of section 13 by an amount a. The dimensions of the portions 10 and 11 and the section 13 are the same as those of the arrangement illustrated in FIG. 2 except that the section 13 is somewhat longer. In this case, it was found that an offset of about 1 micron produced mode powers differing by only a small amount, giving a geometry having low losses for a total bend angle of 6°.

With reference to FIG. 4, in another integrated optic device in accordance with the invention, a multi-moded section 14 and adjacent lead-in and lead-out portions 15 and 16 are such that there is a smooth transition between the inner and outer bounds of the section 14 and adjacent portions 15 and 16. This is a particularly advantageous structure, having low losses.

Figure 1:
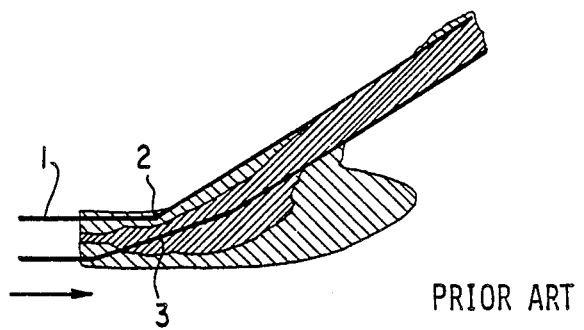
FIG. 1 illustrates a known waveguide bend comfiguration.
Figure 5:
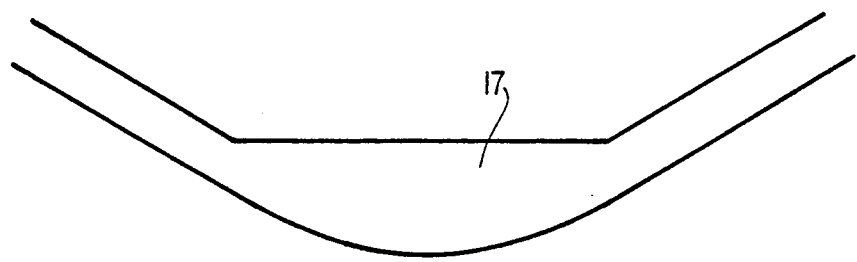

FIG. 5 shows another structure in which there is a smooth transition between the inner and outer bounds of different parts of the waveguide. In this embodiment, the outer bound is curved to eliminate the discontinuity of slope present in the structure illustrated in FIG. 4. The maximum width of the bi-moded section 17 is about a micron larger than the widths of the sections shown in FIGS. 2 to 4 and again this structure exhibits particularly low power losses at the bend.

With reference to FIG. 6, another device includes a waveguide 18 which comprises a multi-moded section 19, the outer and inner bounds 20 and 21 of which are both curved, the radius of curvature of the outer bound 20 being smaller than that of the inner bound 21.

Figure 7:
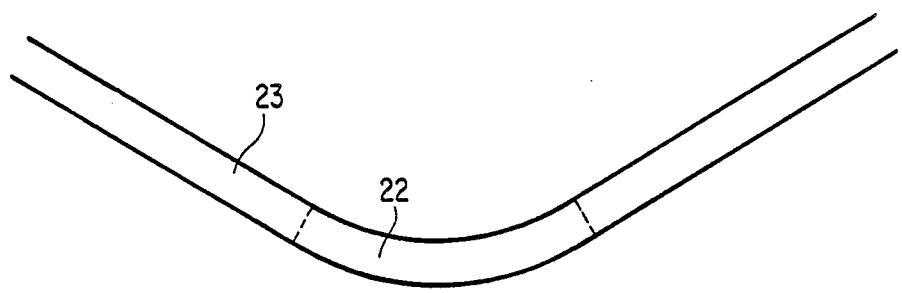

In another advantageous embodiment of the invention, illustrated in FIG. 7, a multi-moded section 22 is located at a bend in a waveguide 23. The width of the section 22 and the rest of the waveguide 23 is substantially the same, the multi-moded capability of the section 22 being achieved by increasing its refractive index compared to that of adjacent parts of the waveguide.

We claim:

1. An integrated optic device comprising an optical waveguide having a bend, said optical waveguide including a waveguide section at the bend capable of supporting more than one waveguide mode at the operating frequency and having inner and outer bounds, a substantial portion of the light energy transmitted within said device being in at least two of the modes of said waveguide section, each of said modes having a wavefront which interacts with another mode to produce a combined wavefront that tilts from one side to the other of said optical waveguide.

2. A device as claimed in claim 1 wherein the optical waveguide is substantially symmetrical in configuration about the bend in the region of the bend.

3. A device as claimed in claim 1 wherein said optical waveguide further includes waveguide portions adjacent said waveguide section, and wherein there is a smooth transition between the inner bound of said waveguide section and that of at least one of said waveguide portions.

4. A device as claimed in claim 1 wherein said optical waveguide further includes waveguide portions adjacent said waveguide section, and wherein there is a smooth transition between the outer bound of said waveguide section and that of at least one of said waveguide portions.

5. A device as claimed in claim 1 wherein the outer bound of said waveguide section is curved.

6. A device as claimed in claim 1 wherein the inner bound of said waveguide section is curved.

7. A device as claimed in claim 1 wherein the dimensions of the waveguide are such that the amount of optical power transmitted in each mode of the waveguide section is substantially equal.

8. A device as claimed in claim 7 wherein said waveguide section has a first center line, and wherein said optical waveguide further includes waveguide portions each having a second center line adjacent said waveguide section, said first center line being offset from said second center lines.

9. A device as claimed in claim 1 wherein said optical waveguide further includes waveguide portions adjacent said waveguide section, and wherein the width of said waveguide section at its widest point is approximately twice the width of said waveguide portions.

10. A device as claimed in claim 1 wherein said optical waveguide further includes waveguide portions adjacent said waveguide section, and wherein the refractive index of said waveguide section is greater than that of said waveguide portions.

11. A device as claimed in claim 10 wherein the width of the optical waveguide at the waveguide section and waveguide portions is substantially the same.

12. A device as claimed in claim 1 wherein the bend undergone by light between entering and leaving the waveguide section is greater than about 5°.

13. An integrated optic device comprising an optical waveguide having a bend, said optical waveguide including a waveguide section at said bend having a first center line, and a waveguide portion having a second center line inclined at an angle with respect to said first center line, said first center line being offset from said second center line, said waveguide section being capable of supporting more than one waveguide mode at the operating frequency, the amount of power transmitted in each mode of the waveguide section being substantially equal.

14. An integrated optic device comprising an optical waveguide having at least one bend, said optical waveguide including a waveguide section at said bend and first and second waveguide portions, the width of said waveguide section at its widest point being approximately twice the widths of said first and second waveguide portions, said waveguide section being capable of supporting more than one waveguide mode at the operating frequency.

* * * * *